United States Patent [19]
Hussey

[11] 3,815,168
[45] June 11, 1974

[54] UNITIZED WINDSHIELD CLEANING SYSTEM
[75] Inventor: James L. Hussey, Centerville, Ohio
[73] Assignee: General Motors Corporation, Detroit, Mich.
[22] Filed: Nov. 20, 1972
[21] Appl. No.: 308,278

[52] U.S. Cl............................ 15/250.02, 15/250.17
[51] Int. Cl. ............................................... B60s 1/46
[58] Field of Search....... 15/250.01, 250.02, 250.03, 15/250.04, 250.16, 250.17

[56] References Cited
UNITED STATES PATENTS
| 3,503,091 | 3/1970 | Petry et al. | 15/250.02 |
| 3,574,882 | 4/1971 | Petry | 15/250.02 |
| 3,703,017 | 11/1972 | Edwards et al. | 15/250.02 |

Primary Examiner—Peter Feldman
Attorney, Agent, or Firm—W. A. Schuetz

[57] ABSTRACT
In a preferred form, this disclosure relates to a unitized windshield cleaning apparatus having a wiper unit for oscillating a pair of windshield wipers across a windshield of an automotive vehicle between inboard and outboard positions during running operation and to a depressed parked position spaced from the inboard position when running operation is being terminated and a washer unit for delivering washer fluid to the windshield when energized. The windshield cleaning apparatus comprises a housing means, a drive means for effecting oscillation of the wipers between their inboard and outboard positions, a parking mechanism having an interruptable driving connection with the drive means to effect movement of the wipers to their parked position when wiper operation is being terminated, a washer pump assembly having an interruptable driving connection with the drive means of the wiper unit and a clutch means including a single shiftable clutch element for selectively drivingly connecting the washer pump assembly with the drive means of the wiper unit or drivingly connecting the park mechanism with the drive means of the wiper unit when termination of wiper operation is desired.

5 Claims, 12 Drawing Figures

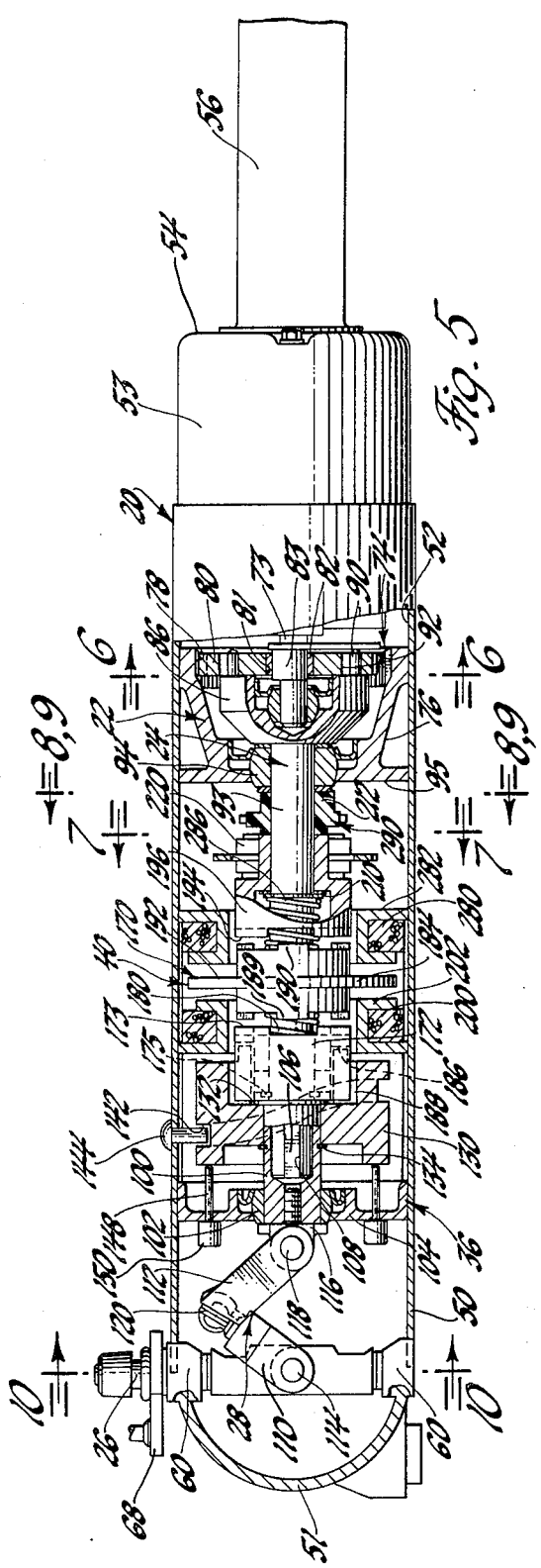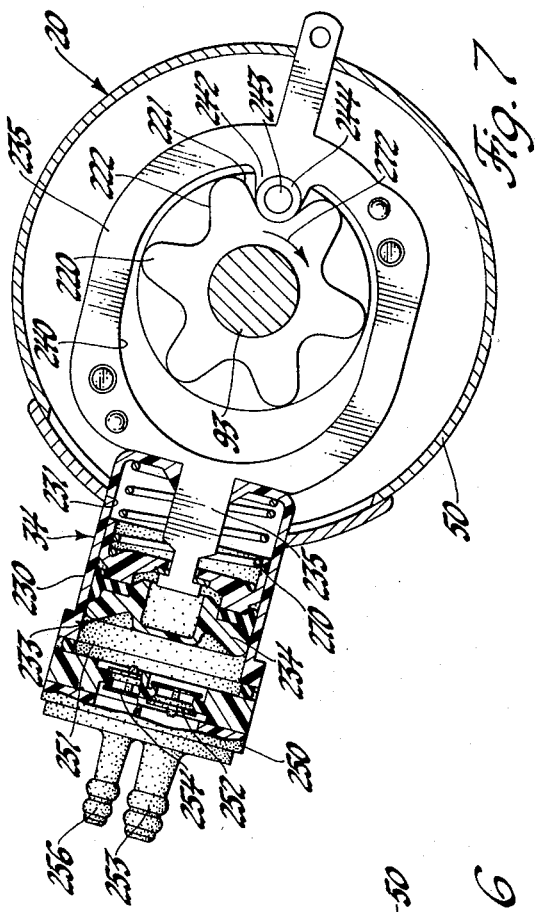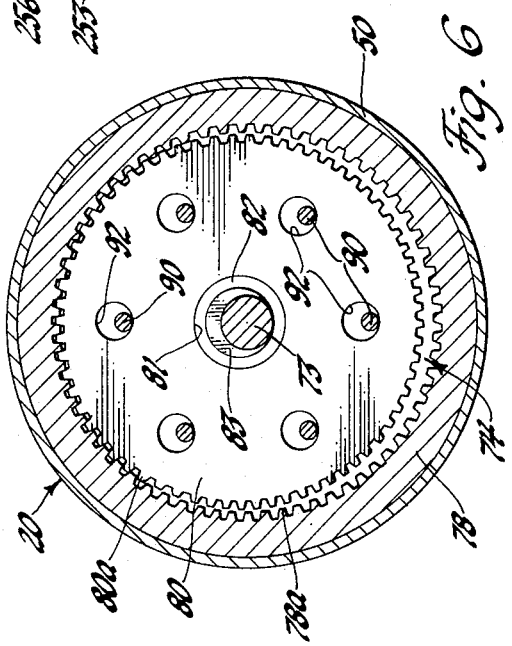

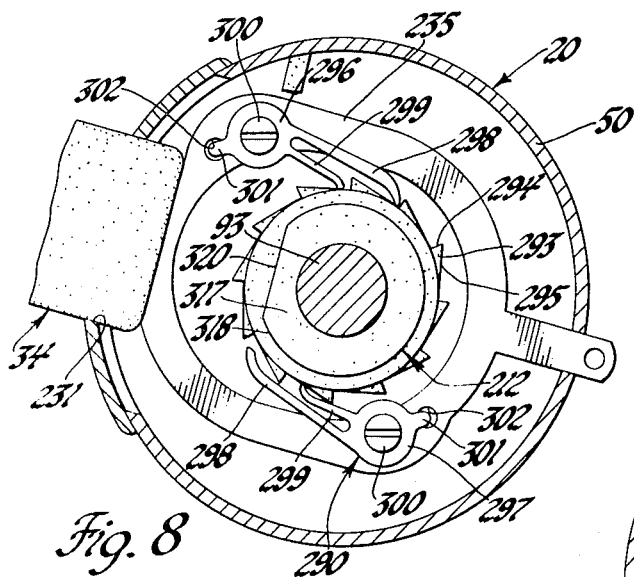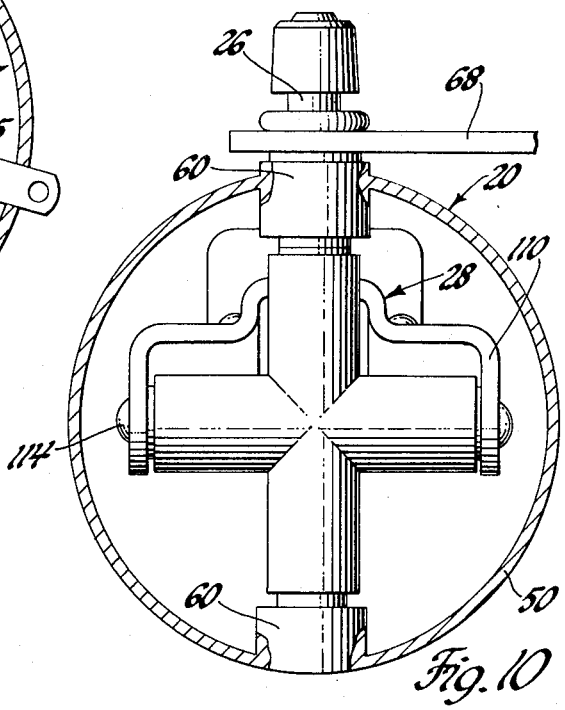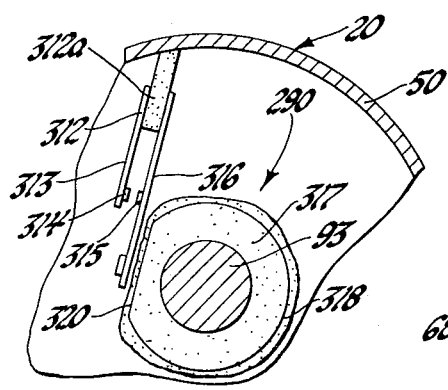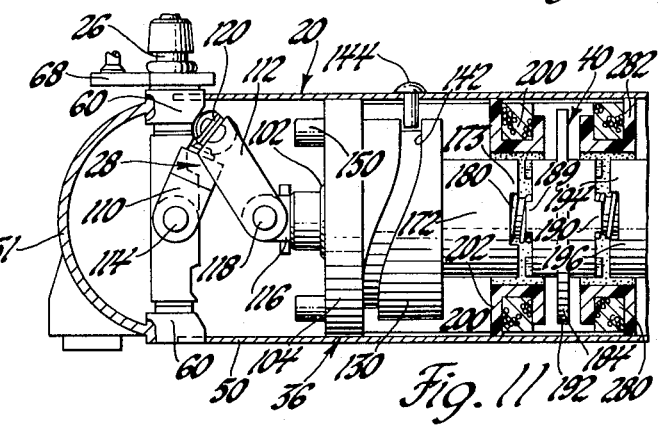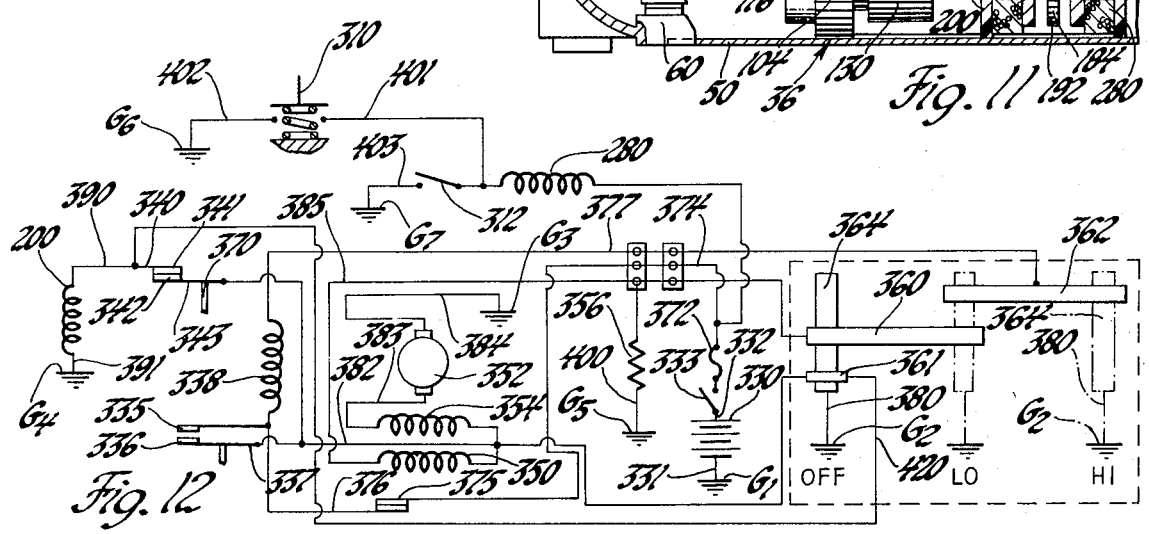

UNITIZED WINDSHIELD CLEANING SYSTEM

The present invention relates to a windshield cleaning apparatus for cleaning a windshield of an automotive vehicle, and in particular to a unitized windshield cleaning apparatus having a wiper unit for oscillating a pair of wipers across a windshield of an automotive vehicle between inboard and outboard positions during running operation and to a depressed parked position spaced from the inboard position when running operation is being terminated, and a washer unit for delivering washer fluid to the windshield when desired.

A broad object of the present invention is to provide a new and improved unitized windshield cleaning apparatus of the character described immediately above and which is of a relatively compact construction, is preassembled as a unit prior to its attachment to the vehicle and in which a single selectively operable clutch means is provided to actuate either the washer unit or a parking mechanism for effecting movement of the wipers beyond their inboard position toward their park position when wiper operation is being terminated.

A further object of the present invention is to provide a new and improved unitized windshield cleaning apparatus of the character described above and which includes an elongated housing means, a selectively energizable drive means carried by the housing means and having a rotatable drive shaft means, an oscillatable output shaft supported by the housing means for rotation about an axis extending perpendicular of the axis of rotation of the drive shaft means and which is adapted to be operatively connected with the wipers to effect oscillation thereof, a driven means drivingly connected with the drive shaft means and the output shaft and being operable to impart oscillatory movement to the output shaft in response to being rotated by the drive shaft means, a parking mechanism including shiftable means movable axially of the drive shaft means to vary the amplitude of the oscillatory movement of the output shaft, a washer pump assembly carried by the support means for pumping washer fluid under pressure to the windshield when drivingly connected with the drive shaft means, and a clutch means including a clutch element drivingly connected with the drive shaft and which is normally disposed in the neutral position, the clutch element being shiftable in one direction from the neutral position to drivingly connect the washer pump assembly with the drive shaft means and being shiftable in the opposite direction from the neutral position to effect movement of the shiftable means to increase the amplitude of the output shaft to effect movement of the wipers to their parked position when wiper operation is being terminated.

Yet another object of the present invention is to provide a new and improved windshield cleaning apparatus, as defined in the next preceding object, and in which the driven means includes a pair of swivelly interconnected links which define an acute included angle therebetween and wherein the shiftable means is operable to vary the angular relationship between the links to vary the amplitude of the oscillatory movement of the output shaft to effect movement of the wipers toward their parked position when wiper operation is being terminated.

A further object of the present invention is to provide a new and improved unitized windshield cleaning apparatus, as defined in the next preceding object, and in which the washer pump assembly is a programmed washer pump assembly having a timer mechanism which is operable to keep the clutch means in driving engagement with the washer pump assembly for a predetermined time interval.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 5 is an enlarged fragmentary sectional view, with portions in elevation, of the windshield cleaner assembly shown in FIG. 2;

FIG. 6 is an enlarged sectional view taken approximately along line 6—6 of FIG. 5;

FIG. 7 is an enlarged sectional view, with portions shown in elevation, and taken approximately along line 7—7 of FIG. 5;

FIG. 8 is an enlarged fragmentary sectional view taken approximately along line 8—8 of FIG. 5;

FIG. 9 is an enlarged fragmentary sectional view taken approximately along line 9—9 of FIG. 5;

FIG. 10 is an enlarged fragmentary sectional view taken approximately along line 10—10 of FIG. 5;

FIG. 11 is a fragmentary sectional view like that shown in FIG. 5, but showing different parts thereof in different positions; and FIG. 12 is a schematic electrical wiring diagram for controlling operation of the unitized windshield cleaner apparatus of the present invention.

Figure 1:
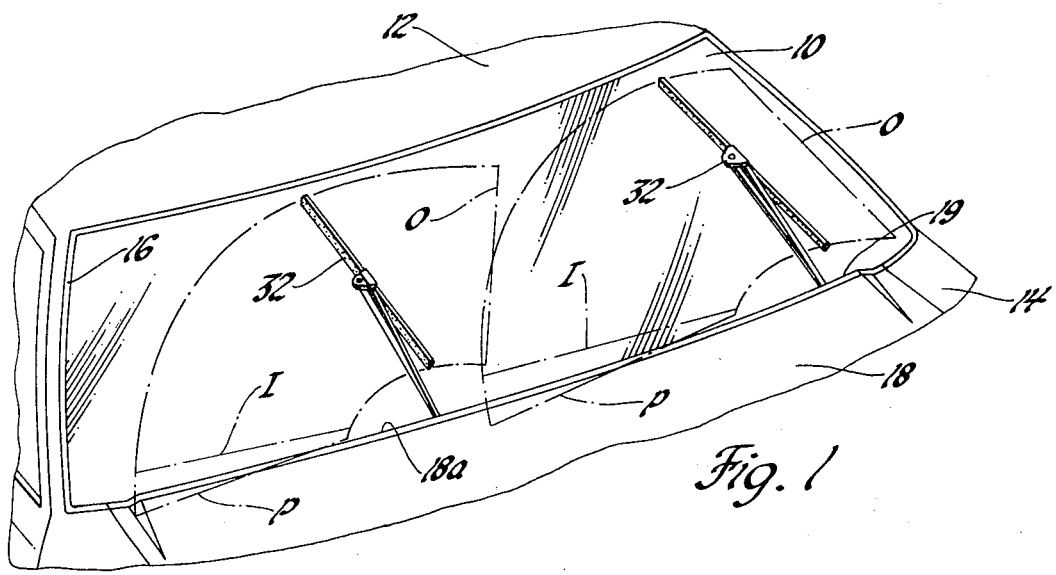
FIG. 1 is a fragmentary perspective view of an automotive vehicle embodying the novel windshield wiper apparatus of the present invention.

As representing a preferred embodiment of the present invention, the drawings show a windshield cleaning apparatus A for cleaning a windshield 10 of an automotive vehicle 12. The windshield 10 is supported by suitable body structure 14 of the vehicle and is surrounded by a reveal molding 16. The vehicle 12 includes a hood 18 whose rearward edge 18a is spaced from the windshield 10 to define an elongated transversely extending slot 19.

The unitized windshield cleaning apparatus A braodly comprises an elongated housing means 20, a drive means 22 including a gear reduction unit carried by the housing means and having a drive shaft means 24, a pair of output shafts or drive pivots 26 rotatably supported by the housing means 20 for oscillatory movement about an axis extending perpendicular to the rotational axis of the drive shaft means 24, a driven means 28 operatively connected with the leftmost output shaft 26, as viewed in FIG. 5, and the drive shaft means 24 for imparting oscillatory movement to the output shaft 26 when rotated by the drive shaft means 24, a linkage means 30 for drivingly interconnecting the output shaft 26, a pair of conventional windshield wipers 32 drivingly connected to the output shafts 26, a washer pump assembly 34 carried by the housing means 20 and having an interruptible driving connection with the drive shaft means 24, a parking mechanism 36 for controlling the amplitude of the oscillatory movement imparted to the output shafts 26, and a clutch means 40 which is selectively operable to drivingly interconnect the washer pump 34 with the drive shaft means 24 and to drivingly interconnect the parking mechanism 36 with the drive shaft means 24.

The windshield wipers 32 are adapted to be oscillated across the outer surface of the windshield 10 between inboard and outboard positions, designated by reference numerals I and O, respectively, during running operation and to a depressed parked position P within the slot 19 when running operation is being terminated. The wipers 32 when in their depressed parked position are thus concealed or substantially concealed from view.

Figure 2:
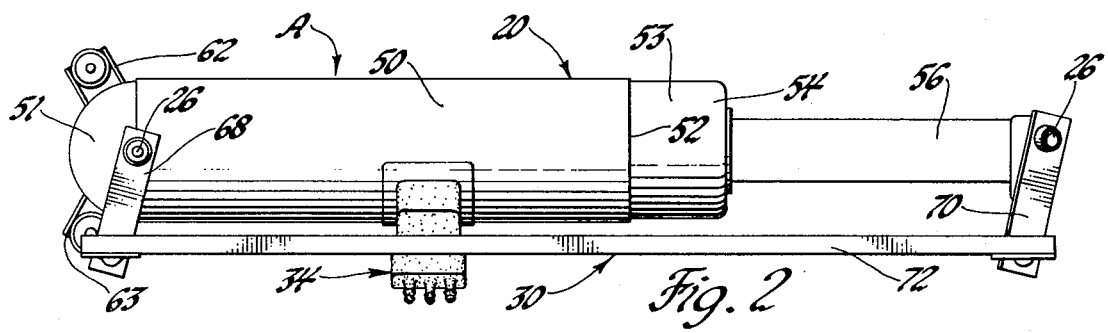
FIG. 2 is a top plan view of the unitized windshield cleaner apparatus of the present invention.
Figure 3:
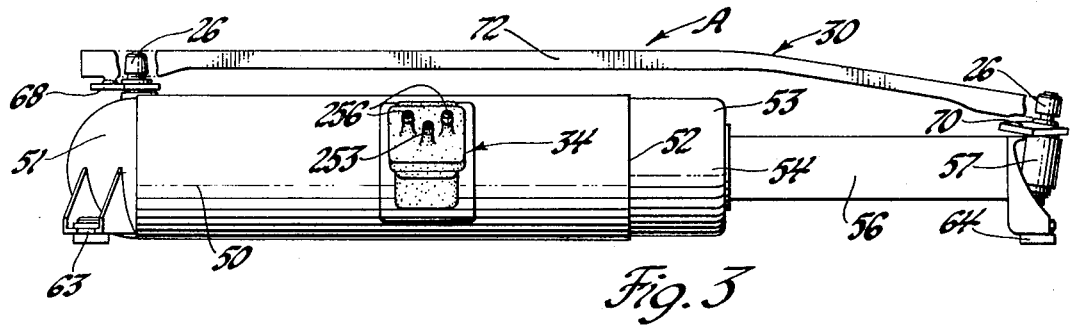
FIG. 3 is a side elevational view of the windshield cleaner apparatus shown in FIG. 2.
Figure 4:
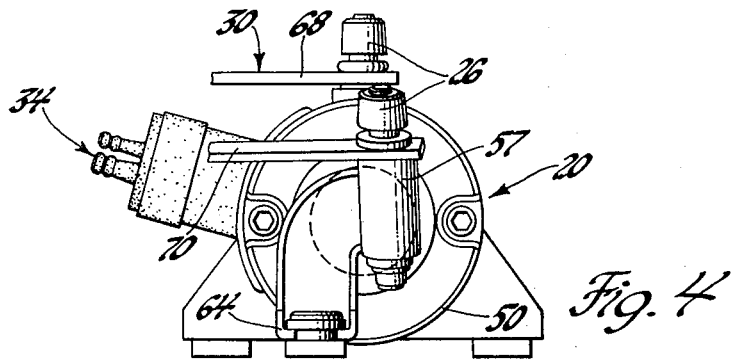
FIG. 4 is an enlarged end elevational view of the windshield cleaner apparatus shown in FIG. 2.

The housing means 20 comprises an elongated cylindrically shaped hollow housing member 50 having a closed, rounded end 51 and an open end 52 which receives a cylindrical housing 53 of an electric motor 54 of the drive means 22. The motor 54 is suitably secured to the housing member 50 and supports an elongated bracket 56 at its end remote from the housing member 50. The bracket 56 at its end remote from the housing member 50 carries a bearing means 57 for rotatably supporting the rightmost output shaft 26, as viewed in FIG. 2. The housing member 50 adjacent its closed end carries a pair of bearings 60 at diametrically opposite locations which rotatably support the leftmost output shaft 26.

The housing means 20 also includes three legs 62–64 to enable the same to be bolted to the body structure 14 of the vehicle 12 and with the output shafts 26 extending through slots (not shown) in the body structure 14 so as to be disposed within the elongated slot 19. The wipers 32 are suitably secured and drivingly connected to the output shafts 26. The output shafts 26 are drivingly connected with each other by the linkage means 30. The linkage means 30 comprises a crank arm 68 connected to the leftmost output shaft 26 and a crank arm 70 connected to the rightmost output shaft 26, as viewed in FIG. 2. The crank arms 68 and 70 are drivingly interconnected by a cross link 72 swivelly connected to the ends of the crank arm 68 and 70 remote from the output shafts 26. From the foregoing, it should be apparent that when oscillatory movement is imparted to the leftmost output shaft 26, the rightmost output shaft 26 is also oscillated by the drive linkage means 30 so as to cause both of the wipers 32 to be oscillated across the outer surface of the windshield in tandem.

The leftmost output shaft 26 is adapted to be oscillated by the driven means 28, which in turn is rotated by the drive means 22. The drive means 22 comprises the electric motor including a rotatably armature shaft 73 and a gear reduction unit 74. The gear reduction unit 74 comprises a stationary annular member 76 secured to the housing member 50. The annular member 76 adjacent its right end, as viewed in FIG. 5, defines an annular internal ring gear 78 having circumferentially spaced teeth 78a. In meshed engagement with the ring gear 78 is a gear 80 having external gear teeth 80a. The gear 80 has a central opening 81 which receives a sleeve bearing 82, the sleeve bearing in turn receiving an eccentric portion 83 of the armature shaft 73 of the electric motor 54. That is, the axis of rotation of the armature shaft 73 is radially spaced from the central axis of the shaft portion 83. As best shown in FIG. 6, the external diameter of the gear 80 and the eccentricity of the portion 83 is such that only a small circumferential extending portion of the gear 80 is in meshed engagement with the ring gear 78 at any one time. Also, the number of teeth on the gear 80 is less than the number of teeth on the ring gear 78, preferably one less tooth than the ring gear 78. It should be apparent from FIG. 6 that when the armature shaft 73 is rotated, the eccentric portion 83 continuously causes different circumferential portions of the gear 80 to be moved into meshed engagement with the adjacent gear teeth 78a of the ring gear 78 and, since the gear 80 has one less tooth than the gear 78, the gear 80 will be rotated an angular increment equal to the pitch of the gear teeth. This effects a gear reduction and causes the gear 80 to be rotated at a much lesser speed than the speed or rotation of the armature shaft 73.

The gear 80 is drivingly connected with the drive shaft 24 via a spider 86. To this end, the spider 86 carries a plurality of annularly spaced axially extending pins 90 which are received in oversized openings 92 in the gear 80, i.e., the diameter of the openings are greater than the diameter of the pins 90. The oversized openings 92 are provided in order to allow the gear 80 to be moved radially into engagement with the gear 78 while remaining drivingly connected with the pins 90. The spider 86 at its hub is suitably welded or otherwise secured to the drive shaft means 24 and imparts the rotative movement of the gear 80 to the drive shaft 24. The drive shaft means 24 includes a main shaft 93 which is supported adjacent its right end, as viewed in FIG. 6, by a bearing 94 carried by a radially extending portion 95 of the annular member 76. The drive shaft 93 adjacent its left end is slidably received within a sleeve 100 rotatably supported by a bearing 102 carried by a radially extending support member 104 suitably secured to the housing member 50. The sleeve 100 is both rotatably supported by the bearing 102 and supported for axial movement relative thereto, as for reasons to be hereinafter more fully described. The sleeve 100 is drivingly connected to the shaft 93 via a radially inwardly extending drive key 106 which is slidably received within an axially extending key way 108 in the drive shaft 93. The key drive between the shaft 93 and the sleeve 100 allows the sleeve 100 to remain drivingly connected to the drive shaft 93 even when moved axially relative thereto.

The drive shaft means 24 is drivingly connected with the output drive pivot 26 via the driven means 28. The driven means 28 is operable to impart oscillatory movement to the leftmost output shaft 26, as viewed in FIG. 5, when rotated by the drive shaft means 24. The driven means 28 comprises a pair of links 110 and 112. The link 110 is bifurcated or in the form of a yoke and is pivotally connected to the drive pivot 26 by a pivot pin means 114. The link 112 is pivotally connected to an eyelet 116 by a pivot pin means 118, the eyelet 116 in turn being threadedly secured to the sleeve 100. The links 110 and 112 at their adjacent ends are swivelly interconnected via a ball and socket joint 120.

It should be apparent that when the drive shaft means 24 is rotated, the link 112 is rotated. Rotation of the link 112 causes the link 110 to be oscillated which in turn causes the output shaft 26 to be oscillated, since the link 112 is swivelly connected to the link 110 via the ball joint 120. As best shown in FIG. 5, the links 110 and 112 define an acute angle therebetween and the angular relationship is such that during running operation, the amplitude of the oscillatory movement imparted to the output shafts 26 is such so as to cause the wipers to be oscillated across the windshield 10 between their inboard and outboard positions, I and O, respectively.

When wiper operation is being terminated, the parking mechanism 36 is energized to cause the angular relationship between the links 110 and 112 of the driven means 28 to be changed to increase the amplitude of the oscillatory movement imparted to the output shaft 26 to cause the wipers 32 to be moved beyond their inboard stroke end I toward their depressed park position P. The parking mechanism comprises a shiftable means in the form of an annular cam 130 rotatably supported on the sleeve 110. The cam 130 is held against relative axial movement with respect to the sleeve 110 by a flange 132 on the right end of the sleeve and an annular snap ring 134 secured within an external circumferentially extending groove in the sleeve 110, as viewed in FIG. 5. The annular cam 130 has a helically extending groove 142 in its outer periphery which receives a stationary pin or rivet 144 carried by the housing member 50.

The annular cam 130 is axially movable relative to the drive shaft 93 between a first position, as shown in FIG. 5, during running operation, and a second position, as shown in FIG. 11, when running operation is terminated. When in the first position, as shown in FIG. 5, a plunger 148 of a park switch 150 is extended and the park switch is spring biased to a closed position. When in its second position, as shown in FIG. 11, the cam holds the park switch plunger 148 in a retracted position which holds the park switch 150 in an open position. Also, movement of the cam 130 from its first position, as shown in FIG. 5, towards its second position, as shown in FIG. 11, causes the sleeve 100 to be moved axially of the drive shaft 93 toward the left, which in turn causes the angular relationship between the links 110 and 112 to decrease which in turn causes the amplitude of the oscillatory movement imparted to the output shaft 26 to be increased to effect movement of the wipers toward their parked position. The cam 132 remains in its second position as shown in FIG. 11 when the wiper unit is de-energized and then is moved from its second position towards its first position, as shown in FIG. 5, in response to energization of the wiper motor 54. During this movement toward its first position, the angular relationship between the links 110 and 112 is increased to reduce the amplitude of the oscillatory movement of the output shaft 26. This causes the wipers 32 to be moved out of their parked position and thereafter between their inboard and outboard positions I and O during running operation.

The annular cam 130 is adapted to be shifted between its positions via a dog clutch means 170. The dog clutch means 170 comprises a first annular dog clutch element 172 having a plurality of annularly spaced axially extending dogs or teeth 173. The dog clutch element 172 is rotatably supported on the drive shaft 93, but held against axial movement relative to the drive shaft 93. Movement to the left, as viewed in FIG. 5, of the dog clutch element 172 is prevented by a snap ring 175 which is received in an annular external groove in the drive shaft 93 and movement to the right is prevented by a compression spring 180 which encircles the drive shaft 24 and has one end in abutting engagement with the dog clutch element 172 and its other end in abutting engagement with a shiftable dog clutch element 184. The dog clutch element 172 has an axially extending key way 186 on its outer side which slidably receives a radially inwardly extending key 188 on the annular cam member 130 to drivingly connect the dog clutch element 172 to the cam member 130, but yet allow the cam member 130 to move axially of the drive shaft 93 relative to the dog clutch element 172.

The shiftable clutch element 184 has a plurality of annularly spaced dogs or teeth 189 at one axial end and a plurality of annularly spaced dogs or teeth 190 at its other axial end. Intermediate the ends of the shiftable element 184 is a radially extending flange 192. The teeth 189 are adapted to be interdigitate or mate with the teeth 173 on the clutch element 172 and the teeth 190 are adapted to interdigitate and mate with teeth 194 on a clutch element 196 for the washer pump assembly 34.

The shiftable clutch element 170 is shiftable from a normal neutral position, as shown in FIG. 5, leftward in opposition to the biasing force of the spring 180 so that its teeth 189 mate with the teeth 173 of the clutch element 172 to effect rotation of the clutch element 172 with the drive shaft 93. When the shiftable clutch element 184 is clutched to the clutch element 172, the clutch element 172 and hence the cam 130 is rotated. Rotation of the cam 130 causes the pin 144, as a result of its riding in the helical groove 142 of the cam 130, to cam or shift the cam 130 axially toward the left with the sleeve 100 to increase the amplitude of the oscillatory element 26 to effect movement of the wipers to their depressed park position P.

The shiftable element 184 is adapted to be moved from its center or neutral position, as shown in FIG. 5, leftward to drivingly engage the clutch element 172 by a solenoid coil 200. The solenoid coil 200 is carried by an annular support channel 202 secured to the housing member 50 and with the radial flange 192 of the shiftable clutch element 184 serving as the armature. After the wipers reach their parked position P, the solenoid 200 is de-energized and the shiftable clutch element 184 is returned to its center or neutral position by the spring 180.

The shiftable clutch element 184 can also be moved from its center or neutral position, as shown in FIG. 5, towards the right to cause the teeth 190 to mate with the teeth 194 on the clutch element 196 to effect energization or activation of the washer pump assembly 34. The clutch element 196 is rotatably supported on the drive shaft 93 but held against relative axial movement thereof. To this end, the drive shaft 93 carries an annular snap ring 210 which is received within an external circumferential groove in the drive shaft 93 to prevent movement of the clutch element 196 toward the left. Movement of the clutch element 196 toward the right is prevented as a resut of its engagement with an annular ratchet wheel 212 rotatably supported on the drive shaft 24 an which in turn bears against the bearing 94. The clutch element 196 adjacent its right end portion is in the form of an annular multi-lobe cam 220 and with each lobe of the cam having a rise portion 221 and a fall portion 222. The cam 220 is adapted to effect reciprocable movement of the washer pump assembly 34, and in a manner hereinafter more fully described.

The washer pump assembly 34 comprises a plastic housing 230 secured to the support housing member 50 and which extends through an opening 231 at its side. The housing slidably receives a reciprocable plunger or plunger means 233. The plunger means 233 comprises a piston assembly 234 and a pump rod or member 235 having one end connected to the piston assembly and which extends through and rearwardly of the pump housing 230. The pumping member 230 comprises a flat plate like member having an enlarged central opening 240 which surrounds the cam 220. The pumping member 235 at its rearward end has an ear 242 which carries a pin 243 for rotatably supporting a cam follower or roller 244. The cam follower roller 244 is in peripheral engagement with the lobes of the cam 220.

The washer pump assembly 34 also includes a valve chamber part 250 secured to the housing 230 at its forward end remote from the pumping member 235 and which defines with the piston assembly 234 a chamber 251. The valve chamber part 250 contains an inlet check valve 252 for controlling communication between an inlet nipple 253 and the chamber 251 and a pair of outlet check valves 254 for controlling communication between the chamber 251, and a pair of outlet nipples 256.

The plunger 233 is adapted to be reciprocably moved through intake and discharge strokes. When moved through its intake stroke, toward the right, as viewed in FIG. 7 of the drawings, washing fluid is drawn from a reservoir (not shown) via a conduit (not shown), inlet nipple 253 and past check valve 252 into the chamber 251. When the plunger is moved through its discharge stroke, toward the left, as viewed in FIG. 7, the fluid in the chamber 251 is forced under pressure past the outlet check valves 254 and delivered via outlet nipples 256 and conduits (not shown) to nozzles (not shown) mounted on the vehicle 12 adjacent the lower edge of the windshield 10. The fluid delivered to the nozzles is emitted in jet form and directed toward designated areas on the windshield 10 located in the path of movement traversed by the wipers 32.

The plunger 233 is moved through its discharge stroke by a compression spring 270 encirculing pumping member 235 adjacent its left end and having one end in abutting engagement with the end wall of the housing 230 and the other end in abutting engagement with the piston assembly 233 at its side opposite the chamber 251. The compression spring 270 biases the plunger toward engagement with the valve chamber part 250.

The plunger 233 is adpated to be moved toward the right in opposition to the biasing force of a compression spring 270 through its intake stroke by the cam 220 when the latter is rotated in the direction of the arrow 272. As shown in FIG. 7, when the washer unit is not energized, the piston assembly is biased to a position which is at the end of its discharge stroke by a spring 270. The cam follower roller 244 is located at the low point of the cam 220 between adjacent cam lobes. As the cam 220 is rotated in the direction of the arrow 272, the rise portion 221 of one of the lobes of the cam causes the pumping member 235 to be moved toward the right and the plunger 233 to be moved toward the right in opposition to the biasing force of the spring 270. This movement continues until the cam follower roller 244 passes the high point of the lobe of the cam 220 it is engaged with. Continued rotation of the cam 220 causes the spring means 270 to move the plunger through its discharge stroke and the cam follower roller 244 to be moved along the fall portion 222 of the lobe of the cam 220 until it reaches the low point of the next adjacent cam lobe. This reciprocable movement of the plunger means 233 continues as long as the cam 220 is rotated.

The cam 220 is adapted to be rotated to operate the washer pump assembly by moving a shiftable clutch element 184 toward the right from its neutral position, as shown in FIG. 5, to drivingly engage the clutch element 196. This movement is effected by energization of a solenoid coil 280 carried by annular channel shaped member 282 secured to the housing 50. When the washer unit is de-energized after the wash cycle by de-energizing the solenoid coil 280, the shiftable clutch element 184 is returned towards its center neutral position, as shown in FIG. 5, by a compression spring 286 which encircles the drive shaft 93 and has one end in abutting engagement with the clutch element 196 and its other end in abutting engagement with the clutch element 184. Thus, the clutch element 184 via the compression springs 286 and 182 is always biased towards its center neutral position halfway between the solenoids 200 and 280.

The washer pump assembly 34 also includes a timer and control mechanism 290 to maintain the solenoid 280 energized for a predetermined time interval, i.e., a predetermined number of wiper strokes in response to momentary energization of the solenoid 280. The control and timer mechanism 290 comprises the plastic ratchet wheel 212 which is rotatably supported by the drive shaft 93 and which has a plurality of peripherally spaced ratceht teeth 293. The ratchet teeth each have a first side 294 which extends radially of the ratchet wheel 212 and a linearly tapered side 295.

The ratchet wheel 212 is adapted to be intermittently indexed angular distances equal to one ratchet tooth each time the pumping member 235 is moved through one of its strokes until one complete revolution of the ratchet wheel 212 takes place. To this end, the pump rod carries a pair of ratchet pawls 296 and 297 at diametral opposite locations of the ratchet wheel 212. Each pawl has a pair of spaced flexible legs 298 and 299 and is secured to the pumping member via a suitable screw 300 and by having a downwardly extending tab 301 hooked within an opening 302 in the member 235. This prevents the pawls 296 and 297 from rotating relative to the member 235. The legs 298, 299 of the drive pawls 296 and 297 are adapted to engage adjacent teeth of the ratchet wheel 212 and effect movement of the ratchet wheel 212 an angular distance of one ratchet tooth each time the drive member 235 is moved toward the right and left to move the plunger through its intake and discharge strokes, respectively. During movement of the plunger 45 through its intake and discharge strokes, the legs 298, 299 of the pawls 297 and 296 are respectively engaged with the tapered sides 295 of the teeth 293 and are deflected radially outwardly thereby until the plunger 233 reaches the end of its stroke at which time the legs 298 and 299 will deflect radially inwardly and hook behind the sides 294 of the next adjacent ratchet teeth. Reverse rotation of the ratchet wheel 212 is prevented by the pawl 296 or 297 not engaged in the indexing movement.

It should be noted at this point that the washer unit is adapted to be energized by momentary depression of the push button switch 310 (see FIG. 12) to effect energization of the solenoid 280. In order to keep the solenoid 280 energized to keep the shiftable clutch member 184 in driving engagement with the clutch member 196 to operate the pump, an auxiliary switch 312 is provided. The auxiliary switch 312 is carried by an insulating core 312a secured to the housing member 50 and includes a stationary terminal 313 having a contact 314 and a mobile contact 315 carried by a deflectable, resilient leaf spring 316. The bias of the leaf spring 316 is such that the contacts 314, 315 are spring biased apart as shown in FIG. 9. The leaf spring 316 is adapted to be deflected to move the contact 315 into engagement with the contact 314 by an annular plastic cam 317 formed integral with the ratchet wheel 212. The cam 317 has a circular peripherally extending cam surface 318 and a flattened peripherally extending cam surface portion 320.

When the washer pump assembly 34 is de-energized, the flattened portion 320 is engaged with the leaf spring 316 and thus, the contacts 314, 315 are biased apart or in their open position. When the wash button switch 310 is momentarily depressed to effect energization of the solenoid 280 to effect a driving connection between the shitable clutch element 184 and the clutch element 196 to begin washer pump operation, the ratchet wheel 212 is indexed by the pawl 296 when the member 235 is cammed toward the right, as viewed in FIG. 8. The first indexing movement of the ratchet wheel 212 causes the circular peripheral cam surface 318 to engage the leaf spring to move the same and close the contacts 314, 315 to maintain the solenoid coil 280 energized. The solenoid coil is maintained energized until the ratchet wheel 212 is indexed one complete revolution whereupon the flattened cam surface 320 will be disposed adjacent the leaf spring 316 to allow the leaf spring to spring bias the contacts 314, 315 to their open position to effect de-energization of the solenoid 280, which in turn allows the spring 286 to move the shiftable clutch element 184 toward its neutral position. This disconnects the driving connection between the cam 220 and the drive shaft 93 to stop washer operation.

Operation of the windshield cleaning apparatus A will be described with reference to the schematic control circuit means or diagram shown in FIG. 12. The control circuit means includes a DC battery 330 having one terminal connected via wire 331 to ground $G_1$ and the other terminal connected via wire 332 to ignition switch 333. The control circuit means further includes the park switch 150 having a stationary contact 335 and a mobile contact 336 carried by a leaf spring 337 and the actuator 148 for holding the contacts 335 and 336 separated when the wipers 32 are in their parked position, a relay coil 338 for effecting closing movement of the park switch 150 when energized, a second switch means 340 having a stationary contact 341 and a mobile contact 342 which is carried by a leaf spring 343, the solenoid coil 200, the electric motor 54 having shunt field windings 350, armature 352 and series field windings 354, a resistor 356, the solenoid 280, the washer push button switch 310 and the auxiliary switch 312. The push button switch 310 is spring biased toward an open position, but is depressible in opposition to the biasing force of the spring to a closed position. The control circuit means further includes a manually operable wiper switch having stationary terminals 360, 361 and 362 and a movable bridging member 364 connected to ground $G_2$. The movable bridging member 364 of the wiper switch is movable between an off position, a low speed position, and a high speed position. Preferably, the washer push button switch 310 is operatively connected with the bridging member 364 of the wiper switch so that when the washer switch 310 is moved to its closed position, it automatically cams the bridging member 364 from its off position to its low speed position whereby conjoint operation of the wiper and washer units is effected merely by depression of the washer button switch 310.

The wiper and washer switches can be of any suitable or conventional construction, but preferably comprise a combined switch structure, such as that shown in U.S. Pat. No. 2,948,792.

When the wiper unit is de-energized, the wipers 32 are in their parked position and the driven means 28 and parking mechanism 34 are in the position shown in FIG. 11. In this position, the annular cam 130 through the plunger holds the park switch in its open position and through another plunger 370 holds the switch 340 in its closed position. The latter switch controls energization of the solenoid coil 200, which coil is de-energized, however, due to the fact that the park switch 150 is in its open position.

When the operator desires low speed operation, he will move the bridging member 364 to its low speed position. Movement of the bridging member 364 to its low speed position, completes circuits for energizing the relay coil 338 and the shunt and series field windings and armature of the wiper motor 54. These circuits are from battery 330, wire 332, normally open, but now closed ignition switch 332, circuit breaker 372, wire 374, motor circuit breaker 375, wire 376, relay coil 338, wire 377, stationary contact 362, bridging member 364, wire 380, to ground $G_2$. The completion of this circuit energizes the relay coil 338 which moves the leaf spring of the park switch to its closed position in opposition to the biasing force imposed thereon by the plunger 148. When the park switch 150 is in its closed position, circuits are completed for energizing the series and shunt field windings and armature of the wiper motor 54. These circuits are from battery 330, wire 332, normally open, but now closed ignition switch 333, circuit breaker 372, wire 374, motor circuit breaker 375, wire 376, now closed park switch 150, wire 382, series field windings 354, wire 383, armature 352, wire 384 to ground $G_3$, and from 382, shunt field winding 375, wire 385, stationary terminal 360, bridging member 364, wire 380, to ground $G_2$. The closing of park switch 150 also completes a circuit for energizing the relay coil 200. This circuit is from battery 330, wire 332, normally open, but now closed ignition switch 333, circuit breaker 372, wire 374, motor circuit breaker 375, wire 376, now closed park switch 150, wire 382, switch 340 (which is held closed by the plunger 370), wire 390, solenoid coil 200, wire 391, to ground $G_4$. The energization of the electric motor 54 and the solenoid coil 200 causes the drive shaft means 24 to be rotated and the clutch element 184 to be drivingly connected with the clutch element 182 to effect simultaneous rotation of the cam 130. Rotation of the cam 130 will cause the same, due to the helical groove 142 to be moved toward the right from its position shown in FIG. 11 toward its position shown in FIG. 5. This axial movement of the cam 130 relative to the drive shaft 24 occurs during the first 180° of rotation of the cam 130, during which movement the wipers 32 will have been moved from their parked position to their outboard position O. Movement of the cam 130 toward the right to its position shown in FIG. 5 causes the angular relationship between the links 110 and 112 to be increased and reduces the amplitude of the oscillation imparted to the output shaft 26. When the cam 130 has reached its position shown in FIG. 5, the leaf spring 343 will have moved the plunger 370 toward the right and opened the contacts 340 and 341. When this occurs, the solenoid 200 is de-energized and the spring 173 returns the shiftable clutch element 184 towards its center neutral position. This disconnects the driving connection between the clutch means 170 and the cam 130 and thus, the driven means 28 will be maintained in the position shown in FIG. 5 to effect oscillation of the wipers between their inboard and outboard positions, I and O.

When the operator desires high speed operation, he will move the bridging member 364 of the wiper switch to its high speed position, as indicated by the phantom lines in FIG. 12. Movement of the bridging member 364 to this position, causes only the stationary contact 362 of the wiper switch to be bridged. When in this position, the hereinbefore described circuits for energizing the relay coil 338, solenoid 200, and the circuits for energizing the series field windings and armature will be completed. The hereinbefore described circuit for energizing the shunt field windings to ground $G_2$ is not completed, since the bridging member 364 does not bridge the contact 360 in the high speed position. When the bridging member 364 is moved to the high speed position, the shunt field windings 350 are energized via a circuit through the resistor 356 whereby the shunt field windings are only partially energized, which causes the wiper motor 54 to operate at high speed and in a manner well-known to those skilled in the art. This latter circuit is from battery 330, wire 332, normally open, but now closed ignition switch 333, circuit breaker 372, wire 374, motor circuit breaker 375, wire 376, now closed park switch 150, wire 382, shunt field windings 350, wire 385, resistor 356, wire 400 to ground $G_5$.

When the wiper unit is operating at either low speed or high speed operation and the operator desires to activate the washer unit, he need momentarily depress the washer pump button switch 310. Depression of the switch 310 completes a circuit for energizing the solenoid coil 280. This circuit is from battery 330, wire 332, now closed ignition switch 333, circuit breaker 372, solenoid coil 280, wire 374, wire 401, now closed washer switch 310, wire 402, to ground $G_6$. Energization of the solenoid coil 280 causes the shiftable clutch member 184 to be moved toward the right from its neutral position, as shown in FIG. 5, to drivingly interconnect the shiftable element 184 with the clutch element 196 for rotating the washer cam 220. Rotation of the washer cam effects movement of the plunger means 233 through its intake stroke and discharge stroke and in a manner hereinbefore described. Also, as noted hereinbefore, when the ratchet wheel has been indexed one indexing movement, the auxiliary switch 312 is moved to its closed position. This switch maintains the solenoid 280 energized until the ratchet wheel can index one complete revolution, since the push button switch 310 will have been released after being momentarily depressed. This latter circuit is from battery 330, wire 332, normally open, but now closed ignition switch 333, circuit breaker 372, wire 374, solenoid coil 280, wire 401, now closed switch 312, wire 403 to ground $G_7$. The auxiliary switch 312 maintains the solenoid coil 280 energized until the ratchet wheel has completed one complete revolution whereupon the switch 312 is allowed to be moved to its open position to effect de-energization of the solenoid coil 280. De-energization of solenoid coil 280 interrupts the driving connection between the drive shaft and the cam 220 and terminates washer operation.

When wiper operation is no longer desired, the operator will move the bridging member 364 to its off position. Movement of the bridging member 364 to its off position breaks the circuit for relay coil 338 for park switch 150. The park switch 150 remains closed, however, since it is biased toward its closed position and hence, the hereinbefore described circuits for the motor 54 remains energized. Also, movement of the bridging member 364 to its off position completes a circuit for energizing the solenoid coil 200. This circuit is from battery 330, wire 332, now closed ignition switch 333, circuit breaker 372, wire 374, motor circuit breaker 375, wire 376, park switch 150, wire 382, stationary contact 361, wire 420, wire 390, solenoid coil 200, wire 391, to ground $G_4$.

Energization of the solenoid coil 200 shifts clutch element 184 to the left to drivingly engage clutch element 172 and effect rotation of the cam 130. As the cam rotates through an anugular extent of 180°, it is shifted toward the left from its FIG. 5 position to its FIG. 11 position. This decreases the angular relationship between the links 110 and 112 and increases the amplitude of the oscillatory movement of the output shaft 26. During this 180° of movement of the cam 130, the wipers are moved from their outboard position O toward their parked position P. When the cam 130 reaches its FIG. 11 position, it opens the park switch 150 through actuator 148 and closes switch 340 through plunger 370. The opening of the park switch 150 de-energizes the solenoid 200 and wiper motor 54 to terminate wiper operation.

From the foregoing, it should be apparent that a novel unitized windshield cleaning apparatus has been provided which can be readily preassembled and thereafter bolted in place on an automotive vehicle. It should be apparent that both the parking mechanism and a washer pump assembly are actuated by a single shiftable clutch element through selective energization of solenoid coils.

Although the illustrated embodiment thereof has been described in great detail, it should be apparent that certain modifications, changes, and adaptations may be made in the illustrated embodiment, and that it is intended to cover all such modifications, changes and adaptations which come within the spirit of the present invention.

It is claimed:

1. A windshield cleaning apparatus for oscillating a pair of windshield wipers across the windshield of an automotive vehicle between inboard and outboard positions during running operation and to a depressed park position when running operation is being terminated and for delivering washer fluid to the windshield comprising:

a housing means;
a selectively energizable drive means carried by the housing means and having a rotatable drive shaft means;
an oscillatable output shaft supported by said housing means for rotation about an axis extending transversely of the axis of rotation of the drive shaft means and which is adapted to be operatively connected with the wipers to effect oscillation thereof;

driven means drivingly connected with said drive shaft means and said output shaft and being operable to impart oscillatory movement of said output shaft in response to being rotated by said drive shaft;
a parking mechanism including shiftable means movable axially of said drive shaft to and connected with said driven means to increase and decrease the amplitude of the oscillatory movement of the output shaft;
a washer pump assembly carried by said support means for pumping washer fluid under pressure to the windshield when drivingly connected with said drive shaft means;
clutch means including a clutch element drivingly connected with the drive shaft means and which is normally disposed in a neutral position, said clutch member being shiftable in one direction from said neutral position to drivingly connect the washer pump assembly with said drive shaft means and being shiftable in the opposite direction from said neutral position to effect movement of said shiftable means to increase the amplitude of said output shaft to effect movement of the wipers to their parked position when wiper operation is being terminated, and selectively operable means for effecting movement of said clutch member in either of said directions.

2. A unitized windshield cleaning apparatus for oscillating a pair of windshield wipers across an outer surface of a windshield of an automotive vehicle between inboard and outboard positions during running operation and to a depressed parked position when running operation is being terminated and for delivering washer fluid to the windshield comprising:

an elongated, hollow housing means;
a selectively energizable drive means carried by the housing means adjacent one end thereof and having a rotatable drive shaft means extending lengthwise of the housing means;
an oscillatable output shaft supported by said housing means for rotation about an axis extending perpendicularly to the axis of rotation of the drive shaft and which is adapted to be operatively connected with the windshield wipers to effect oscillation thereof;
driven means drivingly connected with said drive shaft means and said output shaft and being operable to impart oscillatory movement to said output shaft in response to rotation of said drive shaft means, said driven means comprising first and second links respectively pivotally connected to said output shaft and said drive shaft means and swivelly connected together at their adjacent ends, said links defining an acute included angle therebetween,
shiftable means movable axially of said drive shaft means between a first position in which the angular relationship between first and second links is such so as to impart oscillation to the output shaft to effect movement of the wipers between their inboard and outboard positions and a second position in which the amplitude of the oscillatory movement imparted to the output shaft is increased to effect movement of the wipers to their depressed parked position;
a washer pump assembly carried by said support means for pumping washer fluid under pressure to the windshield when drivingly connected with said drive shaft;
clutch means including a clutch member drivingly connected with the drive shaft and which is normally disposed in a neutral position, said clutch member being shiftable in one direction from said neutral position to drivingly connect the washer pump assembly with the drive shaft to deliver washer fluid to the windshield and shiftable in the opposite direction from said neutral position to effect movement of said shiftable means from its first position toward its second position to increase the amplitude of the oscillatory output shaft to effect movement of the wipers to their parked position when wiper operation is being terminated, and selectively operable means for effecting movement of said clutch member in either of said directions.

3. A unitized windshield cleaning apparatus for oscillating a pair of windshield wipers across an outer surface of a windshield of an automotive vehicle between inboard and outboard positions during running operation and to a depressed parked position when running operation is being terminated and for delivering washer fluid to the windshield comprising:

an elongated housing means having a tubular portion;

a selectively energizable drive means carried by the tubular portion adjacent one end thereof and having a rotatable drive shaft means extending lengthwise of the tubular portion;
an oscillatable output shaft supported by said tubular portion adjacent its other end for rotation about an axis extending perpendicularly to the axis of rotation of the drive shaft, said output shaft being connected with a linkage means carried by the housing means, the linkage means being adapted to be operatively connected with the windshield wipers to effect oscillation thereof;
driven means drivingly connected with said drive shaft means and said output shaft and being operable to impart oscillatory movement to said output shaft in response to rotation of said drive shaft means, said driven means comprising first and second links respectively pivotally connected to said output shaft and said drive shaft means and swivelly connected together at their adjacent ends, said links defining an acute included angle therebetween,
shiftable means supported by said drive shaft means for movement both axially and rotatively relative to said drive shaft means between a first position in which the angular relationship between first and second links is such so as to impart oscillation to the output shaft to effect movement of the wipers between their inboard and outboard positions and a second position in which the amplitude of the oscillatory movement imparted to the output shaft is increased to effect movement of the wipers to their depressed parked position;

a washer pump assembly carried by said support means for pumping washer fluid under pressure to the windshield when drivingly connected with said drive shaft;

clutch means including a first clutch element rotatably supported by the drive shaft means and drivingly connected with the shiftable means, a second clutch element rotatably supported by the drive shaft means and drivingly connected with said pump assembly and a shiftable clutch element drivingly connected with the drive shaft and which is spring biased toward a neutral position between said first and second clutch elements, said shiftable clutch element being shiftable in one direction from said neutral position to drivingly connect the washer pump assembly with the drive shaft to deliver washer fluid to the windshield and shiftable in the opposite direction from said neutral position to effect movement of said shiftable means from its first position toward its second position to increase the amplitude of the oscillatory output shaft to effect movement of the wipers to their parked position when wiper operation is being terminated and to effect movement of the shiftable means from its second position toward its first position when wiper operation is initiated, and control means including selectively energizable solenoid means for effecting movement of said clutch member in either of said directions.

4. A windshield cleaning apparatus for oscillating a pair of windshield wipers across an outer surface of a windshield of an automotive vehicle between inboard and outboard positions during running operation and to a depressed parked position when running operation is being terminated and for delivering washer fluid to the windshield comprising:

an elongated housing means;

a selectively energizable drive means carried by the housing means and having a rotatable drive shaft means;

an oscillatable output shaft supported by said housing means rotation about an axis extending perpendicularly to the axis of rotation of the drive shaft and which is adapted to be operatively connected with the windshield wipers to effect oscillation thereof;

driven means drivingly connected with said drive shaft means and said output shaft and being operable to impart oscillatory movement to said output shaft in response to rotation of said drive shaft means, said driven means comprising first and second links respectively pivotally connected to said output shaft and said drive shaft means and swively connected together at their adjacent ends, said links defining an acute included angle therebetween, shiftable means including an annular cam supported by said drive shaft means for movement both rotatively and axially relative thereto between a first position in which the angular relationship between first and second links is such so as to impart oscillation to the output shaft to effect movement of the wipers between their inboard and outboard positions and a second position in which the amplitude of the oscillatory movement imparted to the output shaft is increased to effect movement of the wipers to their depressed parked position; said annular cam having a helical groove in its outer periphery which receives a stationary pin carried by the housing means;

a washer pump assembly carried by said support means for pumping washer fluid under pressure to the windshield when drivingly connected with said drive shaft;

clutch means including a first clutch element rotatably supported by said drive shaft means and drivingly connected with the shiftable means, a second clutch element rotatably supported by said deive shaft means and drivingly connected with said pump assembly, a shiftable clutch element drivingly connected with the drive shaft and which is spring biased toward a neutral position between said first and second clutch elements, said shiftable clutch element being shiftable in one direction from said neutral position to drivingly connect the washer pump assembly with the drive shaft to deliver washer fluid to the windshield and shiftable in the opposite direction from said neutral position to rotate said annular cam and cause the latter to be connected axially of said drive shaft means toward its second position by said pin to increase the amplitude of the oscillatory output shaft to effect movement of the wipers to their parked position when wiper operation is being terminated and to cam the annular cam toward its first position to decrease the amplitude of the output shaft when wiper operation is being initiated, and control means including selectively energizable solenoid means for effecting movement of said clutch member in either of said directions.

5. A windshield cleaning apparatus, as defined in claim 4, wherein said washer pump assembly includes a reciprocable washer pump having a driving connection with said second clutch element and an electromechanical control and timer mechanism for controlling the length of time said shiftable clutch element is drivingly connected with said second clutch element.

* * * * *